United States Patent [19]

Sias

[11] 4,058,467
[45] Nov. 15, 1977

[54] SULFONATE WATER FLOOD ADDITIVES AND METHOD OF USING SAME
[75] Inventor: Roy C. Sias, Ponca City, Okla.
[73] Assignee: Continental Oil Company, Ponca City, Okla.
[21] Appl. No.: 700,695
[22] Filed: June 28, 1976
[51] Int. Cl.² .............................................. E21B 43/22
[52] U.S. Cl. ............................... 252/8.55 D; 166/273; 166/274
[58] Field of Search ....................... 166/273, 274, 275; 252/8.55 D, 18

[56] References Cited
U.S. PATENT DOCUMENTS

| | | |
|---|---|---|
| 3,422,013 | 1/1969 | Scher ................................. 252/18 X |
| 3,429,811 | 2/1969 | Robbins et al. ..................... 252/18 X |
| 3,469,630 | 9/1969 | Hurd et al. ........................ 166/273 X |
| 3,498,379 | 3/1970 | Murphy ............................ 166/274 X |
| 3,537,996 | 11/1970 | Holst et al. ......................... 252/18 X |
| 3,764,533 | 10/1973 | Hunt et al. ........................ 252/389 X |
| 3,813,337 | 5/1974 | Sheldahl .............................. 252/33.4 |
| 3,874,454 | 4/1975 | Clark et al. ..................... 252/8.55 X |
| 3,933,201 | 1/1976 | Kerfoot et al. ................. 252/8.55 X |
| 3,952,803 | 4/1976 | Kerfoot et al. ................. 252/8.55 X |

Primary Examiner—Herbert B. Guynn
Attorney, Agent, or Firm—A. Joe Reinert

[57] ABSTRACT

Sulfonates having an equivalent weight of about 300 to about 600 are saturated with carbon dioxide and injected into a petroliferous formation to improve a waterflood process.

4 Claims, No Drawings

SULFONATE WATER FLOOD ADDITIVES AND METHOD OF USING SAME

BACKGROUND OF THE INVENTION

This invention relates to anionic waterflood additive compositions and to their use to promote the recovery of secondary and tertiary oil from a petroliferous formation. In one aspect the invention relates to carbon dioxide saturated sulfonates having reduced adsorption characteristics and the use of such compositions to promote the recovery of secondary and tertiary oil from a petroliferous formation.

A large percentage of the oil in petroliferous strata is held within the rock of the strata by the surface forces between the rock, the oil, and the formation of water. As a result, a substantial portion of this oil usually remains in the rock even when wells traversing the strata are no longer productive. Various secondary recovery techniques, such as thermo recovery, gas injection, and water flooding, have been suggested for the recovery of this fixed oil which remains in the formation after it can no longer be produced by primary recovery methods. Of these secondary recovery techniques, waterflooding is quite commonly chosen, and a multitude of methods has been suggested for improving the efficiency and economy obtained from the practice. Such methods frequently include incorporation of a water-soluble surfactant in the waterflood. Typical surfactants which have been proposed for this purpose include alkyl pyridinium salts, sodium lauryl sulfate, sulfonates, glycosides, sodium oleates, quaternary ammonium salts, and the like. The use of such surfactants has arisen because it is widely recognized that a low interfacial tension between the surfactant floodwater and the reservoir crude is essential to the improvement of recovery efficiencies.

Recently it has been proposed that nonionic surfactant solutions, such as a polyoxyethylene-polyoxypropylene copolymer containing solution be injected into the formation through a first of at least two well bores to thereby displace the hydrocarbons towards a second well bore. The nonionic surfactant flood is then followed by the injection of a slug of aqueous caustic into the formation through the first well bore to displace the hydrocarbon and the surfactant toward the second bore. The caustic slug has a basicity at least 1.5 pH units greater than that of the native formation water.

More recently it has been proposed to overbase petroleum derived sulfonates, synthetically derived sulfonates of mixtures thereof to provide an overbased sulfonate waterflood additive having improved residual oil recovering properties. However, in the use of sulfonates, especially synthetically produced sulfonates, problems are often encountered due to the absorption of the sulfonate onto the petroliferous formation. Thus, it is desirable to provide a waterflood additive composition which reduces the amount of surfactant component absorbed on the petroliferous formation.

According to the present invention, anionic waterflood additive compositions have been developed which comprise a carbon dioxide saturated sulfonate having an equivalent weight of about 300 to about 600. Such carbon dioxide saturated sulfonates, when injected into a petroliferous formation, substantially reduce the amount of sulfonate adsorbed on the formation during the waterflood process. Further, any suitable sulfonate having an equivalent weight of from about 300 to about 600, or blends thereof, can be saturated with carbon dioxide and thereafter employed as the waterflood additive composition of the present invention. The sulfonates, which will be more fully described herein, can be obtained by the sulfonation of various refinery streams and synthetic alkylates. Further, the sulfonates can be either neutralized sulfonates or overbased sulfonates.

DETAILED DESCRIPTION OF PREFERRED EMBODIMENTS

As previously stated, the present invention relates to anionic waterflood additive compositions and methods of using same for the recovery of hydrocarbons from petroliferous formations. The anionic waterflood additive compositions comprise carbon dioxide saturated sulfonates having an equivalent weight of about 300 to about 600. The sulfonates employed in the practice of the invention can be water-soluble sulfonates, oil-soluble sulfonates, and mixtures thereof, and can be petroleum derived sulfonates or synthetically derived sulfonates or mixtures.

The petroleum derived sulfonates are prepared by sulfonating a suitable refinery stream which contains hydrocarbon precursors of suitable molecular weight to produce the desired sulfonates or blends thereof. The synthetically derived sulfonates can be prepared by numerous means, such as sulfonating alkyl aryl fractions synthesized in various chemical operations, such as the alkylation of benzene to obtain alkylates of suitable molecular weight. Examples of suitable refinery streams and synthetically produced chemical compounds which can be sulfonated and used in the practice of the present invention are as follows:

pale oil extract;
heavy coker gas oil;
cracked refinery distillate streams;
crude oil having an API gravity of at least 25 and an aromatic hydrocarbon content of at least 15 weight percent,
linear alkenes containing from about 8 to about 32 carbon atoms;
branched-chain alkenes containing from about 8 to about 32 carbon atoms;
an alkylation reaction product and/or by-products of an aromatic hydrocarbon and a partially chlorinated normal $C_{10}$–$C_{18}$ alkane reaction product having 2 to 15 weight percent chlorine content;
an alkylation reaction product and/or by-products of an aromatic hydrocarbon with a partially chlorinated normal $C_{10}$–$C_{18}$ alkane reaction product having 15 to 45 weight percent chlorine content;
an alkylation reaction product and/or by-products of an aromatic hydrocarbon and a straight chain alkene containing from about 10 to about 35 carbon atoms;
an alkylation reaction product and/or by-products of an aromatic hydrocarbon and a branched-chain alkene having 10 to 35 carbon atoms;
an alkylation reaction product and/or by-products of an aromatic hydrocarbon and a chlorinated reaction product of a straight chain alkylaromatic hydrocarbon having the formula R′—Ar—(R″)$_n$ wherein R′ is a straight chain alkyl having 10 to 18 carbon atoms, Ar is a benzene or naphthalene ring having a valence of n+1, R″ is methyl or ethyl, and $n$ is 0, 1, or 2, said chlorination reaction product having a chlorine content of 10 to 60 weight percent;

hydrocarbons having an average molecular weight of at least 400;

hydrocarbons having an average molecular weight of at least 400 in combination with hydrocarbons having an average molecular weight of 200 to 400 (the higher molecular weight hydrocarbons form oil-soluble sulfonates whereas the lower molecular weight hydrocarbons form water-soluble sulfonates);

An alkylation reaction product and/or by-products of an aromatic hydrocarbon and a partially chlorinated $C_{10}$–$C_{18}$ alkane reaction product having 2 to 15 percent chlorine content in combination with an alkylation reaction product of an aromatic hydrocarbon and a branched-chain alkene having 10 to 35 carbon atoms; and, hydrocarbons and refinery streams in any combination with those set forth hereinabove.

The sulfonates so produced can be used alone or in combination with chelating agents or trisodium phosphate monohydrate.

The sulfonated products may be used alone or in combination with each other or with other surfactants such as water-soluble nonionic surfactants. For instance, a desirable surfactant mixture is formed by the mixture of hydrocarbon sulfonates having a molecular weight of at least 400 with nonionic surfactants.

The sulfonation reaction employed to produce the sulfonic acid precursors of the sulfonates employed in the present invention is essentially the same whether petroleum sulfonates or synthetic sulfonates are to be prepared. Any suitable well known sulfonation procedure can be employed. Thus, the sulfonating agent can be oleum, $SO_3$, mixtures of $SO_3$ and $SO_2$, chlorosulfonic acid or the like. Furthermore, the sulfonation can be carried out by either a batch-type process or a continuous process such as a falling film sulfonation process.

The sulfonic acid precursors formed by the above mentioned sulfonation procedures are than neutralized to produce the desired sulfonate and/or sulfonate mixture. When desired, the neutralized sulfonate can be overbased as will be set forth in detail hereinafter. The neutralization and/or overbasing procedure can likewise be carried out by any one of several methods known in the art. Alkali metal hydroxides are the base components employed in the neutralizing and/or overbasing procedures. The most desirable results are obtained where the base component is NaOH.

As previously stated, the sulfonate compositions which are useful in the present invention can be either the neutralized sulfonate or the overbased sulfonates. The term "overbased sulfonates" as used herein is defined to be mixtures of at least one alkali metal sulfonate plus the base component wherein the ratio: "weight of excess base component/weight of alkali metal sulfonate" has a value of about 0.03 to 2.0. Excess base component is that amount of base component present which is not employed to neutralize the sulfonic acid precursor to the sulfonate. Particularly desirable results are obtained when the ratio has a value of about 0.20 to about 1.0.

Generally, the sulfonate constituent employed in the present invention will be a mixture of water-soluble sulfonates and oil-soluble sulfonates. The term "water-soluble sulfonate" as used herein refers to alkali metal hydrocarbon sulfonates having an average equivalent weight of about 200 to about 400, whereas the term "oil-soluble sulfonates" refers to those alkali metal hydrocarbon sulfonates having an average equivalent weight of about 400 or more. The average equivalent weight of such oil-soluble sulfonates will range from about 400 to about 600. The water-soluble sulfonates and the oil-soluble sulfonates can be petroleum derived sulfonates or synthetically derived sulfonates. Average equivalent weight relates to the weight of one equivalent of sulfonate moieties. One can readily determine the average equivalent weight of a sulfonate by employing ASTM Method D2548-69 to isolate the 100 percent sulfonate; then determining the equivalent weight by any convenient means such as percent sulfur, titration, or percent ash.

The sulfonates employed in the practice of the invention can be either mixtures of oil-soluble sulfonates and water-soluble sulfonates, as hereintofore described, or individual sulfonate constituents. However, the average equivalent weight of the sulfonates used in the practice of the invention will range from about 300 to about 600. Desirable results are obtained when the sulfonate constituent has an average equivalent weight of from about 350 to 500. Especially desirable results are obtained when the average molecular weight of the sulfonate employed is from about 400 to 450.

Once the desired sulfonate or sulfonates have been selected, the sulfonate is then saturated with gaseous carbon dioxide. The sulfonate can be saturated with carbon dioxide in concentrated form or as an aqueous solution. When an aqueous solution is employed it will generally contain from about 0.5 to 25 weight percent of the sulfonate composition. Preferably, the carbon dioxide saturation of the sulfonate is carried out at atmospheric pressure and at a temperature of about 70° F. However, temperatures can vary from about 40° to 160° F.

It should be noted that when employing a carbon dioxide saturated overbased sulfonate as the waterflood additive in the practice of the invention the sulfonate can be first saturated with carbon dioxide and thereafter overbased, or the sulfonate composition can be overbased and then saturated with carbon dioxide. Further, the carbon dioxide saturation can be conducted while the sulfonate constituent is in a concentrated or diluted state.

After the sulfonate constituents have been saturated with the carbon dioxide, the resulting anionic waterflood additive compositions are injected into the formation as an aqueous solution which contains from about 0.5 to about 25 weight percent of the carbon dioxide saturated sulfonate mixture. Such injection is carried out through the well-bore so as to place the carbon dioxide saturated sulfonate in the petroliferous subterranean strata from which the hydrocarbon is to be removed. The hydrocarbon which is displaced by the sulfonate containing solution can then be removed by conventional means well known in the art. When formation waters containing calcium and/or magnesium ions are encountered, it is desirable to admix an effective amount of a chelating agent of trisodium phosphate monohydrate with the sulfonate mixture. Further, if difficulties are encountered in the formation of the aqueous mixture of the carbon dioxide saturated sulfonate, whether such sulfonates be neutralized sulfonates or overbased sulfonates, an effective amount of any suitable water-soluble solublilizing agent can be added to the aqueous mixture to mitigate such problems. The amount of water-soluble solubilizing agent can vary widely but will generally be about 0.5 to about 25 percent by weight, based on the weight of the total aqueous sulfonate composition plus aqueous solubilizing agent. Examples of some suitable water-soluble solubilizing agents include aryl sulfonates such as sodium benzene sulfonate, sodium xylene sulfonate, and the like; alcohol ethoxylates and sulfated derivatives wherein the molecule contains about 30 to about 90 weight percent ethylene oxide-derived moiety and the alcohol derived component contains about 2 to about 20 carbon atoms, low molecular weight alcohols such as isobutyl alcohol, sulfonates derived from lower olefins such as butenes and pentenes, and ethoxylated phenols such as octyl phenol ethoxylates and nonyl phenol ethoxylates.

In order to more fully explain the present invention, the following example is given. However, it is to be understood that the example is not intended to function as limitations on the invention as described and claimed hereafter.

EXAMPLE

Experiments were conducted to evaluate the oil recovery properties and adsorption properties of sulfonate waterflood additives and the effect of carbon dioxide upon said additives. The sulfonated waterflood additives employed in each experiment were neutralized sulfonates and were a blend of water-soluble and oil-soluble synthetically derived products.

In one experiment, a 1 × 1 × 3 inches Berea sandstone core was evacuated under vacuum and then saturated with 1 weight percent sodium chloride brine. The brine saturated core was reduced to irreducible water saturation with an oil mixture containing 50 percent white mineral oil[1] and 50 percent refined mineral oil[2] and then waterflooded to residual oil saturation with a 1 weight percent sodium chloride brine solution.

The sulfonate employed in the experiment had an average equivalent weight of 420. The sulfonate, a synthetic sulfonate was formed by blending a sulfonated alkylation bottom product having an equivalent weight of 444, e.g., an alkylate derived from the alkylation of benzene with propylene tetramer (dodecene), with another sulfonated alkylation bottoms product having an equivalent weight of 385, e.g., an alkylate derived from the alkylation of benzene with partially chlorinated linear paraffins. A typical composition of such bottoms products is set forth in Table I.

TABLE I

|  | Alkylation Product (Bottoms) of Alkylation of Benzene with Propylene Tetramer | Alkylation Product (Bottoms) of Alkylation of Benzene Partially Chlorinated Linear Paraffin |
|---|---|---|
| Average Equivalent Wt.[3] Composition, Wt.% | 444 | 385 |
| Monoalkylbenzane | 58 | 10 |
| Dialkyl Benzene | 32 | 40 |
| Diphenylalkane | — | 40 |
| Alkylated Tetralines | — | 10 |
| Paraffin | 10 | 10 |
| Other Aromatics | — | — |

[1]Blandol—product a white mineral oil marketed by Witco Chem.
[2]Soltrol 170—a refined mineral oil marketed by Phillips Petroleum.
[3]Refers to the Na sulfonate derivative.

The sulfonate blend was then employed to prepare a sulfonate-brine mixture containing 1 weight percent sodium chloride, 5 weight percent sulfonate, and 5 weight percent isobutyl alcohol. The mixture was then filtered through a 0.45 micron Millipore filter. A one pore volume slug of the filtered sulfonate solution was then injected into the core. Thereafter, an aqueous solution containing 1 percent sodium chloride and 1000 ppm of a polysaccharide polymer was injected into the core. The polymer was employed so that the viscosity of the aqueous solution is equal to or greater than the sulfonate solution viscosity.

The oil recovered from the core was collected, such representing the percent of pore volume of tertiary oil recovered. The oil recovery run was conducted at 115° F. After the oil had been collected, the core was extracted to determine the residual oil remaining in the core after the before described recovery experiment. The extract phase, which will contain a portion of the oil-soluble sulfonate, was titrated to determine the amount of such sulfonate. Thereafter, the core was again extracted to remove the sulfonate remaining in the core. The amount of sulfonate from the two extractions were determined, and the sum total represented the amount of sulfonate adsorbed in the core. The results from the experiment are set forth in Table 2.

While the recovery of residual oil by the above described experiment was excellent, it was noted that a substantial amount of the sulfonate was adsorbed within the core. Such was of concern because adsorption of a waterflood additive is quite important since high values indicate that under practical field conditions, the additive may not be satisfactory even though tertiary oil recovery is good in laboratory tests. Thus, it is important to provide a proper balance between the oil recovery properties of a waterflood additive and its formation adsorbing properties. The same procedure reported in the first experiment was employed in a second experiment except the brine solution containing the sulfonate was saturated with carbon dioxide at atmospheric pressure and at about 70° F. The results of such experiment are tabulated in Table II.

TABLE II

|  | Experiment 1 | Experiment 2 |
|---|---|---|
| $CO_2$ Treat | No | Yes |
| Recovery Results: |  |  |
| $ROS_1^{(1)}$ | 36–38 | 36–38 |
| $ROS_2^{(2)}$ | 1.4 | 5.4 |
| Total adsorption of sulfonate, micro eg./g. core | 1.633 | 1.104 |

[1]Residual oil present in waterflooded core sample prior to surfactant flooding; determined by solvent extraction.
[2]Residual oil left in core samples after surfactant flooding as a percent of pore volume; determined by solvent extraction.

It should be noted that as a general rule a petroliferous formation will contain from about 36 to 38 percent pore volume oil ($ROS_1$) remaining after a waterflood treatment. Thus, while the use of carbon dioxide saturated sulfonate waterflood additives did not improve recovery in this particular case, the adsorption characteristic of the carbon dioxide saturated additive is greatly improved. Thus, the concept of the invention wherein sulfonate waterflood additives are saturated with carbon dioxide provide an important concept of balancing the oil recovery properties of the additive with its adsorption properties.

Having thus described the invention, I claim:

1. In a method for recovering hydrocarbons from a petroliferous formation which comprises injecting an aqueous fluid into the formation through an injection well and recovering displaced hydrocarbons from the formation through a recovery well; the improvement comprising injecting through the injection well an effective amount of aqueous mixture which contains from about 0.5 to about 25 weight percent of a carbon dioxide saturated alkali metal hydrocarbon sulfonate waterflood additive; the hydrocarbon sulfonate waterflood additive having an average equivalent weight of from about 300 to about 600.

2. The method of claim 1 wherein said hydrocarbon sulfonate waterflood additive is neutralized hydrocarbon sulfonate mixture comprising a water-soluble alkali metal hydrocarbon sulfonate and an oil-soluble alkali metal hydrocarbon sulfonate and said hydrocarbon sulfonate mixture has an average equivalent weight of from about 350 to about 500.

3. The method of claim 2 wherein the water-soluble hydrocarbon sulfonate has an average equivalent weight of about 200 to about 400, the oil-soluble hydrocarbon sulfonate has an average equivalent weight of about 400 to about 600, and the water-soluble hydrocarbon sulfonate and oil-soluble hydrocarbon sulfonate are present in a ratio such that the hydrocarbon sulfonate mixture has an average equivalent weight of from about 400 to about 450.

4. The method of claim 2 which includes the step of incorporating into said aqueous hydrocarbon sulfonate mixture from about 0.5 to about 25 percent by weight of a water-soluble solubilizing agent.

* * * * *